United States Patent
Arthur et al.

(10) Patent No.: US 9,819,021 B2
(45) Date of Patent: Nov. 14, 2017

(54) METASTABLE VANADIUM OXIDE CATHODE MATERIALS FOR RECHARGEABLE MAGNESIUM BATTERY

(71) Applicant: Toyota Motor Engineering & Manufacturing North America, Inc., Erlanger, KY (US)

(72) Inventors: Timothy S. Arthur, Ann Arbor, MI (US); Fuminori Mizuno, Ann Arbor, MI (US); Ruigang Zhang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 380 days.

(21) Appl. No.: 14/515,844

(22) Filed: Oct. 16, 2014

(65) Prior Publication Data

US 2016/0111720 A1 Apr. 21, 2016

(51) Int. Cl.
*H01M 10/054* (2010.01)
*H01M 4/485* (2010.01)
*H01M 4/58* (2010.01)
*C01F 5/02* (2006.01)
*C01F 5/26* (2006.01)
*C01G 31/02* (2006.01)

(52) U.S. Cl.
CPC .......... *H01M 4/5825* (2013.01); *C01G 31/02* (2013.01); *H01M 4/485* (2013.01); *H01M 10/054* (2013.01); *C01P 2002/72* (2013.01); *C01P 2004/03* (2013.01); *C01P 2004/61* (2013.01); *C01P 2006/40* (2013.01)

(58) Field of Classification Search
CPC .. H01M 10/054; H01M 4/5825; H01M 4/485; C01G 31/02; C01F 5/02; C01F 5/26
USPC ........................................................ 429/231.5
See application file for complete search history.

(56) References Cited

U.S. PATENT DOCUMENTS

| | | | |
|---|---|---|---|
| 4,675,260 | A | 6/1987 | Sakurai et al. |
| 4,737,424 | A | 4/1988 | Tobishima et al. |
| 5,273,848 | A | 12/1993 | Noguchi et al. |
| 5,366,830 | A | 11/1994 | Koksbang |

(Continued)

FOREIGN PATENT DOCUMENTS

WO WO 2011/150093 A1 12/2011

OTHER PUBLICATIONS

Baddour-Hadjean et al., New Structural Characterization of the LixV2O5 System Provided by Raman Spectroscopy, Jul. 2006, Chem. Mater., 18, 3548-3556.*

(Continued)

*Primary Examiner* — Sean P Cullen
(74) *Attorney, Agent, or Firm* — Oblon, McClelland, Maier & Neustadt, L.L.P.

(57) ABSTRACT

A magnesium electrochemical cell having a positive electrode containing as an active ingredient, a material of formula $[V_2O_5]_c[M_aO_b]_d$ and/or a material of formula $[V_2O_5]_c[M_aO_b]_d[MgX_e]_g$ in a metastable structural and morphological phase is provided. In the formulas M is an element selected from the group consisting of P, B, Si, Ge and Mo; and X is O or a halide.

20 Claims, 5 Drawing Sheets

(56) References Cited

U.S. PATENT DOCUMENTS

| | | | |
|---|---|---|---|
| 5,437,943 | A | 8/1995 | Fujii et al. |
| 8,241,792 | B2 | 8/2012 | Kaneko et al. |
| 2005/0079418 | A1 | 4/2005 | Kelley et al. |
| 2011/0070500 | A1 | 3/2011 | Chen et al. |
| 2011/0214895 | A1* | 9/2011 | Ihara .................. H01M 10/056 173/217 |
| 2012/0164537 | A1 | 6/2012 | Aoyagi et al. |
| 2013/0101848 | A1 | 4/2013 | Banerjee et al. |

OTHER PUBLICATIONS

Daichi Imamura, et al., "Mg Intercalation Properties into $V_2O_5$ gel/Carbon Composites under High-Rate Condition" Journal of the Electrochemical Society, 150 (6) A753-A758 (2003).

Daichi Imamura, et al., "Characterization of Magnesium-Intercalated $V_2O_5$/Carbon Composites" Solid State Ionics 161 (2003) 173-180.

G. G. Amatucci, et al., "Investigation of Yttrium and Polyvalent Ion Intercalation into Nanocrystalline Vanadium Oxide" Journal of the Electrochemical Society, 148 (8) A940-A950 (2001).

\* cited by examiner

METASTABLE VANADIUM OXIDE CATHODE MATERIALS FOR RECHARGEABLE MAGNESIUM BATTERY

BACKGROUND OF THE INVENTION

The present invention is directed to a positive electrode active material for a magnesium secondary battery and a magnesium battery with a cathode based on the active material.

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/eq and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Production of a battery having an anode based on magnesium requires a cathode which can reversibly adsorb and desorb magnesium ions and an electrolyte system which will efficiently transport magnesium ions. Significant effort in each of these areas is ongoing in many research organizations throughout the world and active materials under investigation include sulfur in various forms, including elemental sulfur, materials known as Chevrel compounds of formula $Mg_xMo_6T_n$, (wherein x is a number from 0 to 4, T is sulfur, selenium or tellurium, and n is 8) and various metal oxides such as $MnO_2$ (alpha manganese dioxide stabilized by potassium), $V_2O_5$ and ion stabilized oxides or hollandiates of manganese, titanium or vanadium.

In this regard, $V_2O_5$ is an extremely promising candidate for the Mg battery cathode, because it is capable of multiple redox reactions between $V^{5+}/V^{4+}/V^{3+}$ and V metal. Also, $V^{5+}$ as a high valence state is quite stable, which means that it is easy to increase the operating voltage. Various research groups have reported efforts directed to utility of $V_2O_5$ as a positive electrode active material.

Sakurai et al. (U.S. Pat. No. 4,675,260) describes an amorphous $V_2O_5$ prepared by adding at least one first additive selected from the group $P_2O_5$, $TeO_2$, $GeO_2$, $Sb_2O_3$, $Bi_2O_3$ and $B_2O_3$ and/or at least one second additive selected from $MoO_3$ and $WO_3$. A molten mixture of the components is prepared and then quenched. In a preferred embodiment the quenching is accomplished by passage through a twin roll quenching apparatus. The amorphous $V_2O_5$ is used as an active cathode material for a lithium battery.

Tobishima et al. (U.S. Pat. No. 4,737,424) describes a lithium secondary battery containing a cathode having an amorphous $V_2O_5$ active material. Substantially pure $V_2O_5$ or $V_2O_5$ mixed with $P_2O_5$, $TeO_2$, $GeO_2$, $Sb_2O_3$, $Bi_2O_3$, $GeO_2$, $B_2O_3$, $MoO_3$, $WO_3$ and $TiO_2$ is indicated as a useful cathode active material. The amorphous material is prepared by melting a mixture of the components and then quenching the melt. Lithium secondary batteries with a cathode containing the amorphous $V_2O_5$ are described.

Noguchi et al. (U.S. Pat. No. 5,273,848) describes a cathode active material containing an amorphous solid solution of $V_2O_5$, $P_2O_5$ and an alkaline earth metal oxide (MO) and optionally $CoO_2$. The amorphous material is prepared by rapidly quenching a melt of the components and in one embodiment the quench is conducted using twin copper rollers. Lithium batteries based on a cathode of the amorphous $V_2O_5$ mixture are described.

Kelley et al. (U.S. 2005/0079418) describes a method to prepare thin film batteries, including lithium, lithium ion and lithium free batteries. Materials described as useful as a cathode active material include amorphous $V_2O_5$. No actual working examples of batteries are provided.

Chen et al. (U.S. 2011/0070500) describes an electrode material prepared by combining an amorphous metal oxide and a crystalline metal oxide. The composite is then used in construction of an electrode. An example based on vanadium pentoxide is described as well as utility as a cathode for a lithium secondary battery.

Aoyagi et al. (U.S. 2012/0164537) describes a cathode material containing $V_2O_5$ crystallites within an amorphous phase of a combination of metal oxides. The amorphous phase metal oxides include vanadium, iron, manganese, silver, copper, cobalt, nickel, tungsten and boron. The crystallite/amorphous dual phase material is obtained by combining the metals as oxides and heating the mixture in an electric furnace to a temperature of approximately 900 to 1100° C. and then pouring the melt onto a stainless steel plate. A magnesium battery containing the dual phase material as a cathode active material is described.

Imamura et al. (Mg Intercalation Properties into $V_2O_5$ gel/Carbon Composites under High-Rate Condition; Journal of the Electrochemical Society, 150 (6) A753-A758 (2003)) describes a $V_2O_5$ carbon composite material which when constructed into an electrode intercalates Mg ion. The composite is formed based on a $V_2O_5$ sol., i.e., a hydrated $V_2O_5$ crystal.

Miyayama et al. (Characterization of magnesium-intercalated $V_2O_5$/carbon composites; Solid State Ionics, 161 (2003) 173-180) describes $V_2O_5$/carbon composites and studies $Mg^{2+}$ reversible diffusion into the $V_2O_5$ xerogel structure. A structural model of the xerogel is described.

Banerjee et al. (U.S. 2013/0101848) describes $VO_2$ and $V_2O_5$ nanoparticles which are doped with metal ions to shift a metal-insulator transition temperature of the particle to a temperature range close to room temperature and make the nanoparticle composition useful for coating applications where thermochromic, electrochromic and/or mechanochromic behavior are sought. Application of these materials as electrode active agents is not disclosed. Reference is made to a metastable polymorph of boron doped $VO_2$ which is noted as of interest as a cathode material for a lithium battery. However, nowhere is there disclosure or suggestion of a metastable form of $V_2O_5$ as an active cathode material in a magnesium battery.

Kaneko et al. (U.S. Pat. No. 8,241,792) describes a nonaqueous lithium secondary battery containing a cathode having $V_2O_5$ as the active material. The morphology of the $V_2O_5$ is set to be essentially an amorphous matrix having units of layered crystalline $V_2O_5$. The length of the crystalline unit is controlled to 30 nm or less. There is no disclosure of a metastable $V_2O_5$ phase as an active cathode material for a magnesium battery.

Fujii et al. (U.S. Pat. No. 5,437,943) describes secondary batteries having lithium or sodium anodes and a cathode having two active ingredients: 1) a conducting polymer and 2) a metal oxide. In the Examples crystalline $V_2O_5$ is described as the second cathode active component. No disclosure or suggestion relative to a cathode active component being a metastable phase of $V_2O_5$ is provided and nowhere is a magnesium battery described.

Koksbang (U.S. Pat. No. 5,366,830) describes a lithium battery having an initial crystalline $V_2O_5$ cathode active ingredient that is amorphotized by discharge with lithium ion insertion into the crystalline structure resulting in disruption of the crystal lattice.

Amatucci et al. (Investigation of Yttrium and Polyvalent Ion Intercalation into Nanocrystalline Vanadium Oxide; Journal of the Electrochemical Society, 148 (8) A940-A950 (2001) (cited in the Invention Disclosure) describes studies showing that nanocrystalline $V_2O_5$ is capable of reversible intercalation of $Mg^{2+}$. This reference provides description of the utility of nanocrystalline $V_2O_5$ as a cathode active material for univalent and multivalent ions and does not disclose or suggest utility of $V_2O_5$ having a metastable morphology.

Imamura et al. (Mg Intercalation Properties into $V_2O_5$ gel/Carbon Composites under High-Rate Condition; Journal of the Electrochemical Society, 150 (6) A753-A758 (2003)) (cited in the Invention Disclosure) describes a $V_2O_5$ carbon composite material which when constructed into an electrode intercalates Mg ion. The composite is formed based on a $V_2O_5$ sol., i.e., a hydrated $V_2O_5$ crystal. This reference does not disclose or suggest utility of $V_2O_5$ having a metastable morphology.

Doe et al. (WO 2011/150093) (cited in the Invention Disclosure) describes a series of compounds which are suitable as cathode materials for a Mg battery. In one embodiment a $V_2O_5$ structure is prepared by first synthesizing a compound $MgV_2O_5$ and then removing the Mg by an electrochemical method. The resulting material is described as having a different stacking of $V_2O_5$ layers from directly prepared $V_2O_5$. Utility of the thus prepared differently stacked $V_2O_5$ as a cathode active material for a Mg battery is proposed. This reference does not disclose or suggest utility of $V_2O_5$ having a metastable morphology.

However, each of the various forms of $V_2O_5$ described above fail to meet all the requirements necessary to function as a positive electrode active material in a magnesium battery which would supply the energy demands of a commercial electric vehicle. Nanocrystalline materials are difficult to be loaded densely in the cathode, which means that the thickness of the nanocrystalline-based cathode should be much thicker than that of micron-sized ones. That is to say that the volumetric energy density for a total cell based on such materials would be decreased. Also, nanocrystalline materials will promote electrolyte decomposition due to the extremely high surface area associated with such structure.

In hydrated forms of $V_2O_5$, much water acts as a ligand in the structure. During magnesium insertion/extraction in a typical non-aqueous media, water is an undesired molecule because a non-conducting and resistive blocking layer due to releasing water is formed on the counter anode.

The predicted redox potentials of $VOPO_4$ and $V_2O_5$ observed at around 2.3-2.6 V by using ab-initio calculations are lower than other known technologies, where the potential was observed at around 3V. As a result, lower voltage decreases the energy density of the battery.

Therefore, an object of the present invention is to provide a $V_2O_5$ based cathode active material which meets the requirements of a high energy magnesium battery and overcomes the deficiencies of the $V_2O_5$ forms conventionally known.

Another object of the present invention is to provide a positive electrode based on the $V_2O_5$ based cathode material and a magnesium battery containing the positive electrode having significantly improved energy density and performance in comparison to known magnesium electrochemical devices.

SUMMARY OF THE INVENTION

These and other objects are addressed by the present invention, the first embodiment of which includes a cathode for a magnesium battery comprising:
a current collector; and
an active material of formula (I):

$$[V_2O_5]_c[M_aO_b]_d \quad (I)$$

wherein M is an element selected from the group consisting of P, B, Si, Ge and Mo, a is an integer of from 1 to 2, b is an integer of from 1 to 5, c is from 35 to 80 mol %, d is from 20 to 65 mol %, and the active material of formula (I) is a metastable structural and morphological phase between an amorphous phase and a crystalline phase.

In a second embodiment, the present invention provides a magnesium battery comprising: an anode; a cathode; and an electrolyte; wherein the cathode comprises: an active material of formula (I):

$$[V_2O_5]_c[M_aO_b]_d \quad (I)$$

wherein M is an element selected from the group consisting of P, B, Si, Ge and Mo, a is an integer of from 1 to 2, b is an integer of from 1 to 5, c is from 35 to 80 mol %, d is from 20 to 65 mol %, and the active material of formula (I) is a metastable structural and morphological phase between an amorphous phase and a crystalline phase.

In a third embodiment, the present invention provides a cathode for a magnesium battery comprising: a current collector; and an active material of formula (II):

$$[V_2O_5]_c[M_aO_b]_d[MgX_e]_g \quad (II)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, g is from greater than 0 to 25 mol %, e is 1 when X is O, e is 2 when X is F, Cl, Br, or I, and the sum of c, d and g is substantially 100% and the active material of formula (II) is a metastable structural and morphological phase between an amorphous phase and a crystalline phase.

In a fourth embodiment, the present invention provides a magnesium battery comprising:
an anode;
a cathode; and
an electrolyte;

wherein the cathode comprises:
an active material of formula (II):

$$[V_2O_5]_c[M_aO_b]_d[MgX_e]_g \quad (II)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, g is from greater than 0 to 25 mol %, e is 1 when X is O, e is 2 when X is F, Cl, Br, or I, and the sum of c, d and g is substantially 100% and the active material of formula (II) is a metastable structural and morphological phase between an amorphous phase and a crystalline phase.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED
EMBODIMENTS OF THE INVENTION

The present inventors are conducting a wide scale study and evaluation of materials which may function as cathode active materials for a magnesium secondary battery. The object of this study is to discover cathode active materials which are readily available, safe and comparatively easy to handle in a production environment and which provide a magnesium battery having high capacity and high working potential.

Throughout this description all ranges described include all values and sub-ranges therein, unless otherwise specified. Additionally, the indefinite article "a" or "an" carries the meaning of "one or more" throughout the description, unless otherwise specified.

As described in U.S. patent application Ser. No. 14/978,635, filed Nov. 13, 2014, the inventors discovered that amorphous compositions of vanadium oxide are capable of magnesium insertion and extraction and that such material when formulated into a cathode allows for the production of a magnesium battery having high capacity and working potential. In ongoing studies of such amorphous materials, the inventors have learned that upon heat treatment the amorphous $V_2O_5$ materials undergo structural and morphological change at temperatures above the glass transition temperature of the system wherein prior to formation of a thermodynamically stable crystalline state, a structural and morphological form which the inventors identify as the metastable state is obtained. The transition temperatures for each of these structural and morphological transitions may be seen on differential scanning calorimetry (DSC) analysis of the material.

Figure 1:
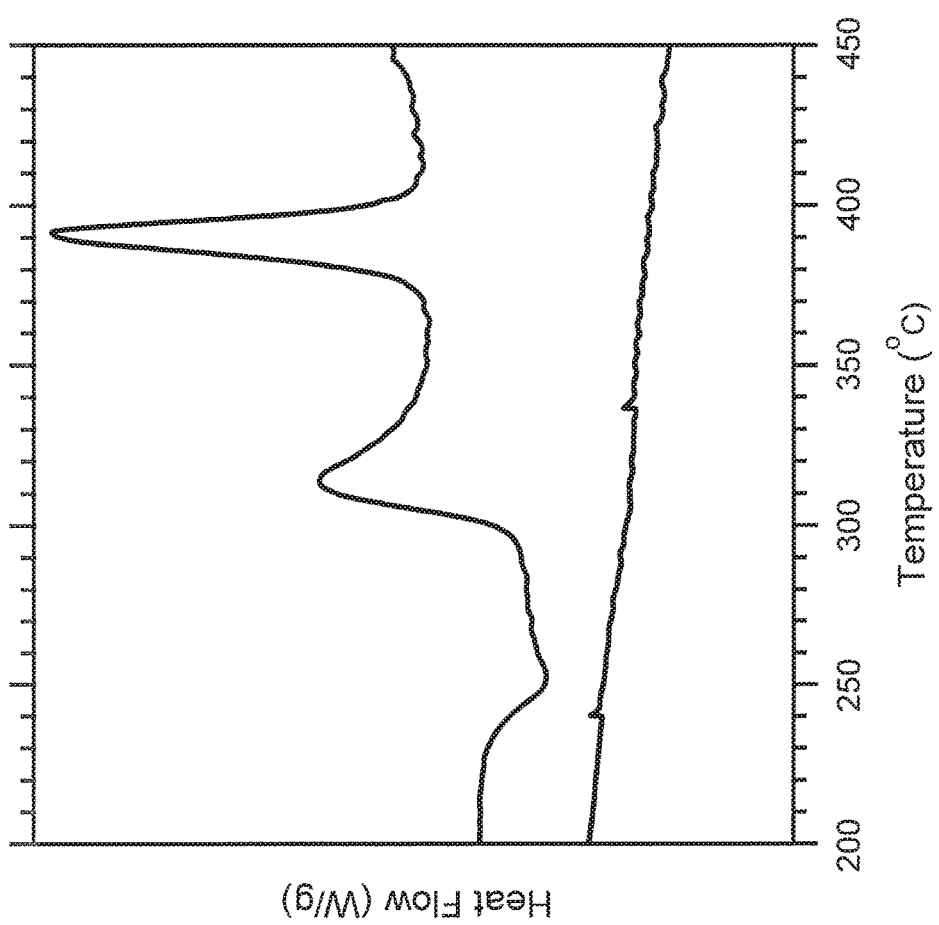
FIG. 1 shows the differential scanning calorimetry curves for crystalline $V_2O_5$ and amorphous $V_2O_5$:$P_2O_5$ (75:25 mol ratio).

For example as shown in FIG. 1 the DSC scan for amorphous $V_2O_5$:$P_2O_5$ (75:25 mol ratio) exhibits a first maximum identified as P1 and a second maximum identified as P2. The inventors have learned that at temperatures of P2 and higher, a thermodynamically stable crystal structure is obtained. However, when the amorphous system is heated only to a temperature from P1 to a temperature less than the onset of the P2 maximum, a metastable morphological form is obtained and unexpectedly, the inventors have discovered that $V_2O_5$ of this metastable structural and morphological phase is employed as a cathode active material, significantly improved battery performance may be obtained in comparison to cathodic materials based on the amorphous phase and/or the thermodynamically stable crystalline phase.

Thus, in the first embodiment, the present invention provides a cathode for a magnesium battery comprising: a current collector; and an active material of formula (I):

$$[V_2O_5]_c[M_aO_b]_d \quad (I)$$

wherein M is an element selected from the group consisting of P, B, Si, Ge and Mo, a is an integer of from 1 to 2, b is an integer of from 1 to 5, c is from 35 to 80 mol %, d is from 20 to 65 mol %, and the active material of formula (I) is a metastable structural and morphological phase between an amorphous phase and a crystalline phase.

The inventors have surprisingly discovered that when amorphous $V_2O_5$ materials are prepared and heat treated at a temperature from P1 to a temperature less than the onset of the P2 maximum for that system, a metastable structural and morphological form is obtained which can provide a cathode active material capable of a 3V class redox reaction.

As shown in Table 1, the values of the glass transition temperature ($T_g$), metastable phase transition temperature (P1) and thermodynamically stable phase transition temperature (P2) vary according to the chemical composition of the amorphous $V_2O_5$.

Amorphorization of the $V_2O_5$ may be conducted employing quenching and ball milling methods which are conventionally known. Addition of glass forming agents containing at least one of $P_2O_5$, $B_2O_3$, $SiO_2$, $GeO_2$ and $MoO_3$ to the $V_2O_5$ during the preparation and by careful monitoring of the formation conditions, provides a substantially amorphous material. According to the present invention, the description "substantially amorphous" means that the material when analyzed by XRD does not show any crystalline peaks.

In a further embodiment, a magnesium halide or magnesium oxide may be added to the $V_2O_5$/$M_aO_b$ mixture to form a composite mix of formula (II):

$$[V_2O_5]_c[M_aO_b]_d[MgX_e]_g \quad (II)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, g is from greater than 0 to 25 mol %, e is 1 when X is O, e is 2 when X is F, Cl, Br, or I, and the sum of c, d and g is substantially 100%, and the active material of formula (II) is a metastable structural and morphological phase between an amorphous phase and a crystalline phase. According to the invention, the description "substantially 100%" means that at least 98 mol % of the mixture is due to the components of formula (II).

The relative mol % content of $V_2O_5$ in the material of formula (I) or of formula (II) affects the performance of a magnesium cell containing the material as a cathode active ingredient. Thus in one embodiment commercially available $V_2O_5$ having a minimum purity of 98%, preferably, a minimum purity of 99% and most preferably, a minimum purity of 99.5% may be physically mixed with a glass forming agent and optionally, magnesium oxide or a magnesium halide in a selected mole % ratio. The physical mixture may then be co-comminuted in any conventional milling apparatus such as a ball mill until an XRD spectrum of the milled composite mixture is devoid of peaks associated with a crystalline material.

In another embodiment, the physical mixture of the $V_2O_5$, glass forming agent and optional magnesium oxide or magnesium halide is heated in an appropriate furnace or oven and quenched by dropping into water or by pressing between two plates or rollers. The amorphous solid solution obtained may then be pulverized.

In either case, the obtained amorphous phase material is heat treated or annealed at a temperature above the $T_g$ from P1 to a temperature less than the onset of the P2 maximum for that amorphous material to obtain the metastable structural and morphological form.

The annealing time may be from 0.5 to 24 hours and the optimum time and temperature to obtain the metastable phase may be determined by DSC analysis as known to one of ordinary skill in the art.

The annealing may be conducted under an inert gas or in ambient air. In one embodiment, the annealing is conducted in ambient air.

Although the grain size of the pulverulent material is not limited, in a preferred embodiment, the grain size is 10 μm or less, more preferably 5 μm or less and most preferably 1 μm or less.

To prepare the cathode the metastable $[V_2O_5]_c[M_aO_b]_d$ of formula (I) and/or metastable material $[V_2O_5]_c[M_aO_b]_d[MgX_e]_g$ of formula (II) may be mixed with a binder. The binder material is not particularly limited and any binder recognized by one of skill in the art as suitable may be employed. Suitable binders may include polyvinylidene fluoride (PVDF), polytetrafluoroethylene (PTFE), styrene butadiene rubber (SBR), and polyimide. Polytetrafluoroethylene may be employed in one preferred embodiment.

In an embodiment of the invention the metastable $[V_2O_5]_c[M_aO_b]_d$ and/or $[V_2O_5][M_aO_b]_d[MgX_e]_g$ may be mixed with a carbonaceous material such as graphite, carbon nanotubes or carbon black.

The amount of binder and carbonaceous material in the cathode composition may be no greater than 50% by weight, preferably no greater than 30% by weight and more preferably, no greater than 10% by weight.

In a further embodiment the present invention provides a magnesium battery comprising: an anode; a cathode; and an electrolyte; wherein the cathode comprises: an active material of formula (I):

$$[V_2O_5]_c[M_aO_b]_d \quad (I)$$

wherein M is an element selected from the group consisting of P, B, Si, Ge and Mo, a is an integer of from 1 to 2, b is an integer of from 1 to 5, c is from 35 to 80 mol %, d is from 20 to 65 mol %, and the active material of formula (I) is a metastable structural and morphological phase between an amorphous phase and a crystalline phase.

In a still further embodiment the present invention provides a magnesium battery comprising: an anode; a cathode; and an electrolyte; wherein the cathode comprises: an active material of formula (II):

$$[V_2O_5]_c[M_aO_b]_d[MgX_e]_g \quad (II)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, g is from greater than 0 to 25 mol %, e is 1 when X is O, e is 2 when X is F, Cl, Br, or I, and the sum of c, d and g is substantially 100% and the active material of formula (II) is a metastable structural and morphological phase between an amorphous phase and a crystalline phase.

Construction of the cathode is described above.

The anode of the magnesium battery may be any anode suitable for a magnesium battery, including an anode of magnesium metal or a composition containing magnesium metal, such as $Mg_3Bi_2$. The anode active material may further include an electrically conductive material and a binder. Examples of electrically conducting materials include carbon particles, such as carbon black. Example binders include various polymers, such as PVDF, PTFE, SBR, and polyimide.

An electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include phenyl magnesium chloride (PhMgCl$^+$) aluminum trichloride (AlCl$_3^-$) in tetrahydrofuran (THF) or magnesium bis(trifluoromethanesulfonyl)imide [Mg(TFSI)$_2$] in acetonitrile (ACN). In a preferred embodiment, the electrolyte may be Mg(TFSI)$_2$ in ACN.

The cathode active material may be present as a sheet, ribbon, particles, or other physical form. An electrode containing the cathode active material may be supported by a current collector.

A current collector may include a metal or other electrically conducting sheet on which the electrode is supported. The current collector may be formed of carbon, carbon paper, carbon cloth or a metal or noble metal mesh or foil.

Figures 4A, 4B, 4C:
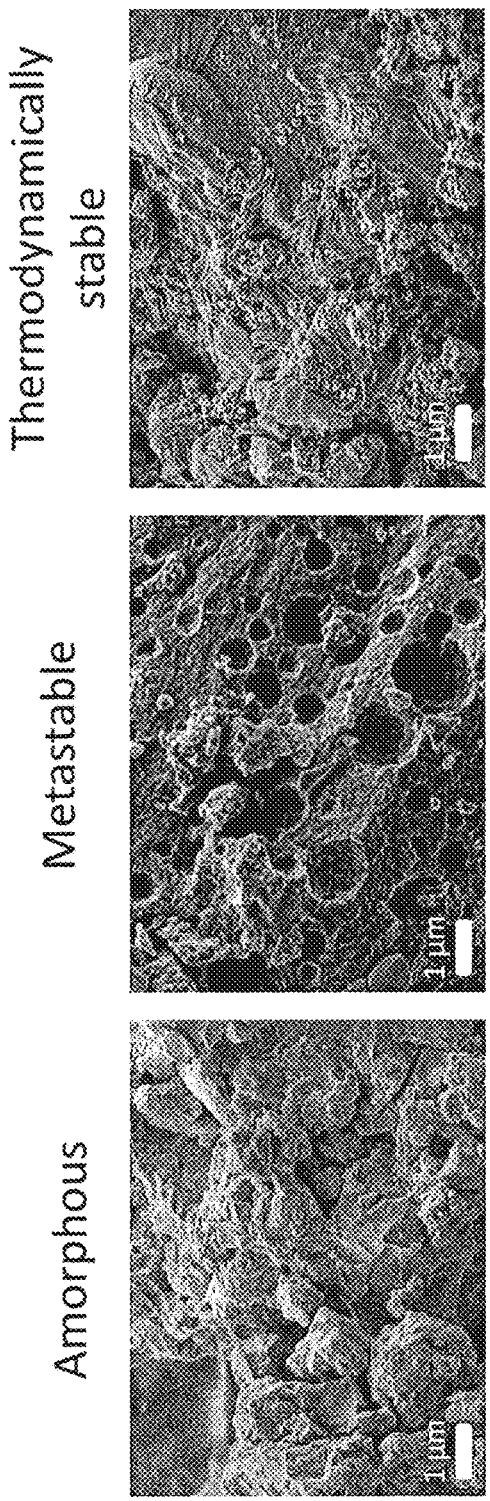
FIGS. 4A, 4B and 4C show scanning electron micrographs (SEM) of amorphous $V_2O_5$:$P_2O_5$ (75:25 mol ratio) (4A), metastable $V_2O_5$:$P_2O_5$ (75:25 mol ratio) (4B) according to one embodiment of the present invention, and thermodynamically stable crystalline phase $V_2O_5$:$P_2O_5$ (75:25 mol ratio).
Figure 5:
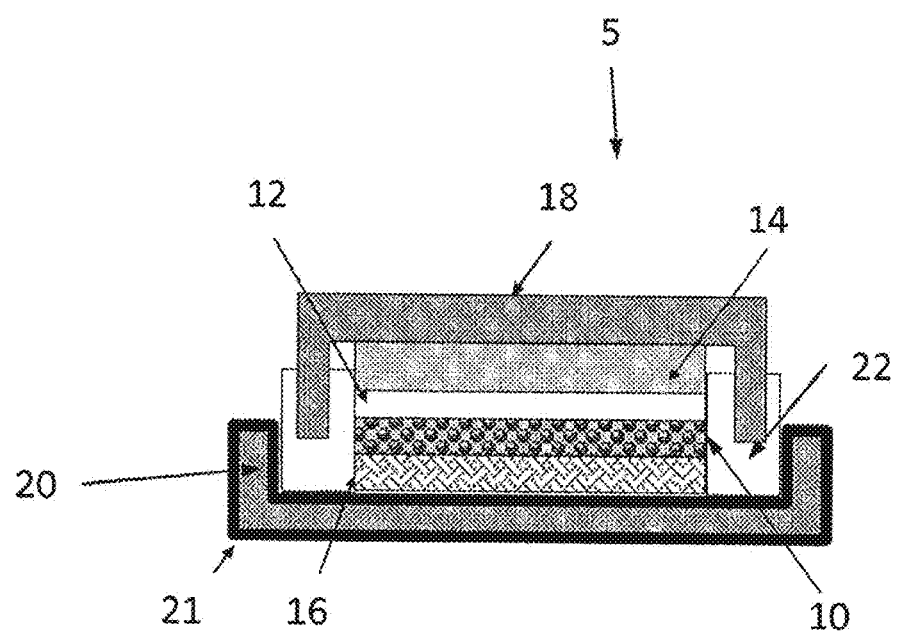
FIG. 5 is a schematic diagram of a magnesium battery according to one embodiment of the present invention.

FIG. 4 shows an example of one configuration of a rechargeable magnesium cell 5. The cell 5 includes a positive electrode 10 including the metastable $[V_2O_5]_c[M_aO_b]_d$ and/or $[V_2O_5]_c[M_aO_b]_d[MgX_e]_g$ material according to the invention as the cathode active material, an electrolyte layer 12, a negative electrode 14, a cathode current collector 16, a negative electrode housing 18, a positive electrode housing 20 including an inert layer 21, and a sealing gasket 22. The electrolyte layer 12 may include a separator soaked in electrolyte solution, and the positive electrode 10 may be supported by the cathode current collector 16. In this example, the negative electrode 14 includes an active material of magnesium metal.

Having generally described this invention, a further understanding can be obtained by reference to certain specific examples which are provided herein for purposes of illustration only and are not intended to be limiting unless otherwise specified.

Examples

Test materials as listed in Table 1, were prepared by ball milling of the $V_2O_5$ and $P_2O_5$ materials under a rotation speed of 370 rpm for 20 h in Ar atmosphere. The balls and pot used for ball milling synthesis were constructed of ZrO2. After ball milling, the samples were annealed to metastable and thermodynamically stable phases respectively in an atmosphere of ambient air.

| V:P | Tg (° C.) | P1 (° C.) | P2 (° C.) |
|---|---|---|---|
| 8515 | 234.67 | 265.24 | 423.05 |
| 8020 | 236.07 | 287.02 | 390.84 |
| 7525 | 244.45 | 313.32 | 391.43 |
| 7030 | 256.76 | 409.42 | 440.45 |

Figure 3:
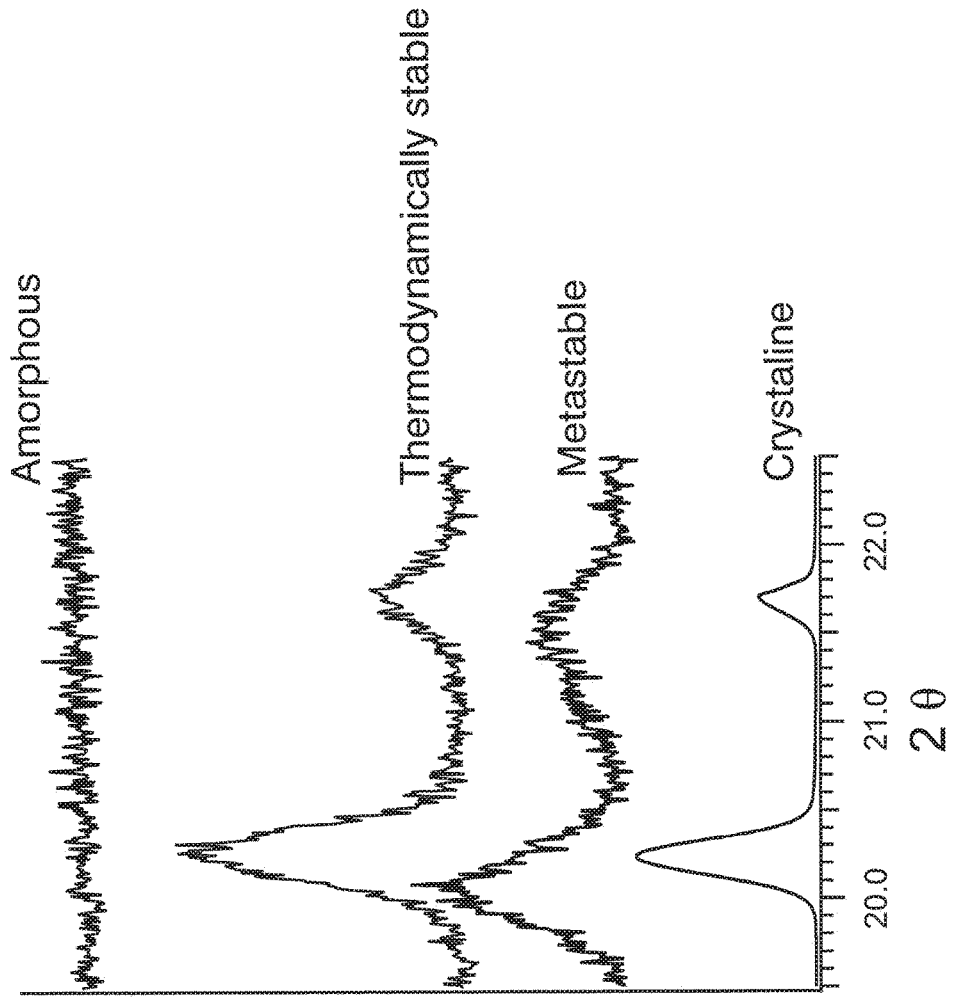
FIG. 3 shows XRD spectra of crystalline $V_2O_5$, amorphous $V_2O_5$:$P_2O_5$ (75:25 mol ratio), metastable $V_2O_5$:$P_2O_5$ (75:25 mol ratio) according to one embodiment of the present invention, and thermodynamically stable crystalline phase $V_2O_5$:$P_2O_5$ (75:25 mol ratio).

FIG. 3 shows the XRD patterns of thermodynamically stable crystalline $V_2O_5$:$P_2O_5$ (75:25 mol ratio), amorphous $V_2O_5$:$P_2O_5$ (75:25 mol ratio), metastable $V_2O_5$:$P_2O_5$ (75:25 mol ratio) and crystalline $V_2O_5$. After preparing the amorphous material as described above, the metastable phase $V_2O_5$:$P_2O_5$ (75:25 mol ratio) was obtained by annealing for 5 hours at 325° C. and the crystalline $V_2O_5$:$P_2O_5$ (75:25 mol ratio) was obtained by annealing for 5 hours at 450° C.

FIG. 4 shows the SEM images of thermodynamically stable crystalline $V_2O_5$:$P_2O_5$ (75:25 mol ratio), amorphous $V_2O_5$:$P_2O_5$ (75:25 mol ratio) and metastable $V_2O_5$:$P_2O_5$ (75:25 mol ratio). After preparing the amorphous material as described above, the metastable phase $V_2O_5$:$P_2O_5$ (75:25 mol ratio) was obtained by annealing for 5 hours at 325° C. and the crystalline $V_2O_5$:$P_2O_5$ (75:25 mol ratio) was obtained by annealing for 5 hours at 450° C.

Figure 2:
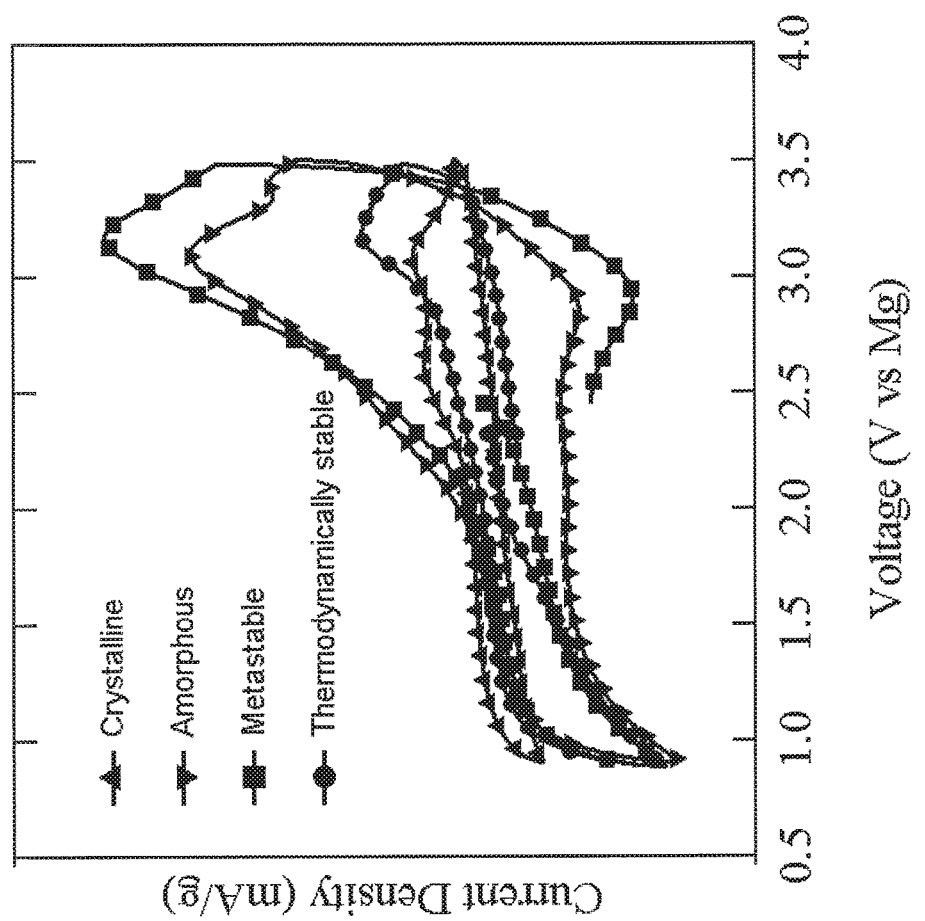
FIG. 2 shows a CV performance comparison of crystalline $V_2O_5$, amorphous $V_2O_5$:$P_2O_5$ (75:25 mol ratio), metastable $V_2O_5$:$P_2O_5$ (75:25 mol ratio) according to one embodiment of the present invention, and thermodynamically stable crystalline phase $V_2O_5$:$P_2O_5$ (75:25 mol ratio).

Cyclic voltammograms of each of the prepared samples were obtained by using Ag reference electrode. In each case the working electrode was composed of the prepared active material, acetylene black and PVDF binder with a weight ratio of 50:25:25 on stainless steel mesh. Mg metal was used as counter electrode, and then either $Mg(TFSI)_2$ or $Mg(ClO_4)_2$ were used as a salt of Mg electrolyte coupled with battery grade acetonitrile solution. The Ag reference solution consisted of 0.1M $AgNO_3$ and 0.01M TBAP as supporting salt in acetonitrile solution. The scanning rate was 0.1 mV/sec and the operating temperature was 25° C. under Ar atmosphere. The Cyclic voltammograms are shown in FIG. 2. As indicated in the curve a higher oxidation peak height was obtained with the metastable phase.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A cathode for a magnesium battery comprising:
a current collector; and
an active material of formula (I):

$$[V_2O_5]_c[M_aO_b]_d \quad (I)$$

wherein
M is an element selected from the group consisting of P, B, Si, Ge and Mo,
a is an integer of from 1 to 2,
b is an integer of from 1 to 5,
c is from 35 to 80 mol %,
d is from 20 to 65 mol %, and
the active material of formula (I) is a metastable structural and morphological phase between an amorphous phase and a crystalline phase.

2. The cathode according to claim 1, wherein a content of the $V_2O_5$ is from 50 to 80 mol %.

3. The cathode according to claim 1, wherein a content of the $V_2O_5$ is from 70 to 80 mol %.

4. The cathode according to claim 1, rein a content of the $V_2O_5$ is 75 mol %.

5. The cathode according to claim 1, wherein $M_aO_b$ is at least one material selected from the group consisting of $P_2O_5$, $B_2O_3$, $SiO_2$, $GeO_2$ and $MoO_3$.

6. The cathode according to claim 1, wherein $M_aO_b$ is $P_2O_5$.

7. A magnesium battery comprising:
an anode;
a cathode; and
an electrolyte;
wherein the cathode comprises:
an active material of formula (I):

$$[V_2O_5]_c[M_aO_b]_d \quad (I)$$

wherein
M is an element selected from the group consisting of P, B, Si, Ge and Mo,
a is an integer of from 1 to 2,
b is an integer of from 1 to 5,
c is from 35 to 80 mol %,
d is from 20 to 65 mol %, and
the active material of formula (I) is a metastable structural and morphological phase between an amorphous phase and a crystalline phase.

8. The magnesium battery according to claim 7, wherein a content of the $V_2O_5$ in the compound of formula (I) is from 50 to 80 mol %.

9. The magnesium battery according to claim 7, wherein a content of the $V_2O_5$ in the compound of formula (I) is from 70 to 80 mol %.

10. The magnesium battery according to claim 7, wherein $M_aO_b$ content of the $V_2O_5$ in the compound of formula (I) is 75 mol %.

11. The magnesium battery according to claim 7, wherein $M_aO_b$ is at least one material selected from the group consisting of $P_2O_5$, $B_2O_3$, $SiO_2$, $GeO_2$ and $MoO_3$.

12. The magnesium battery according to claim 7, wherein $M_aO_b$ is $P_2O_5$.

13. A cathode for a magnesium battery comprising:
a current collector; and
an active material of formula (II):

$$[V_2O_5]_c[M_aO_b]_d[MgX_e]_g \qquad (II)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, g is from greater than 0 to 25 mol %, e is 1 when X is O, e is 2 when X is F, Cl, Br, or I, and the sum of c, d and g is substantially 100%, and the active material of formula (II) is a metastable structural and morphological phase between an amorphous phase and a crystalline phase.

14. The cathode according to claim 13, wherein a content of the $V_2O_5$ is from 50 to 80 mol %.

15. The cathode according to claim 13, wherein $M_aO_b$ is at least one material selected from the group consisting of $P_2O_5$, $B_2O_3$, $SiO_2$, $GeO_2$ and $MoO_3$.

16. The cathode according to claim 13, wherein $M_aO_b$ is $P_2O_5$.

17. A magnesium battery comprising:
an anode;
a cathode; and
an electrolyte;
wherein the cathode comprises:
an active material of formula (II):

$$[V_2O_5]_c[M_aO_b]_d[MgX_e]_g \qquad (II)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, g is from greater than 0 to 25 mol %, e is 1 when X is O, e is 2 When X is F, Cl, Br, or I, and the sum of c, d and g is substantially 100% and the active material of formula (II) is a metastable structural and morphological phase between an amorphous phase and a crystalline phase.

18. The magnesium battery according to claim 17, wherein a content of the $V_2O_5$ in the compound of formula (II) is from 50 to 80 mol %.

19. The magnesium battery according to claim 17, wherein a content of the $V_2O_5$ in the compound of formula (II) is from 70 to 80 mol %.

20. The magnesium battery according to claim 17, wherein $M_aO_b$ is at least one material selected from the group consisting of $P_2O_5$, $B_2O_3$, $SiO_2$, $GeO_2$ and $MoO_3$.

* * * * *